UNITED STATES PATENT OFFICE.

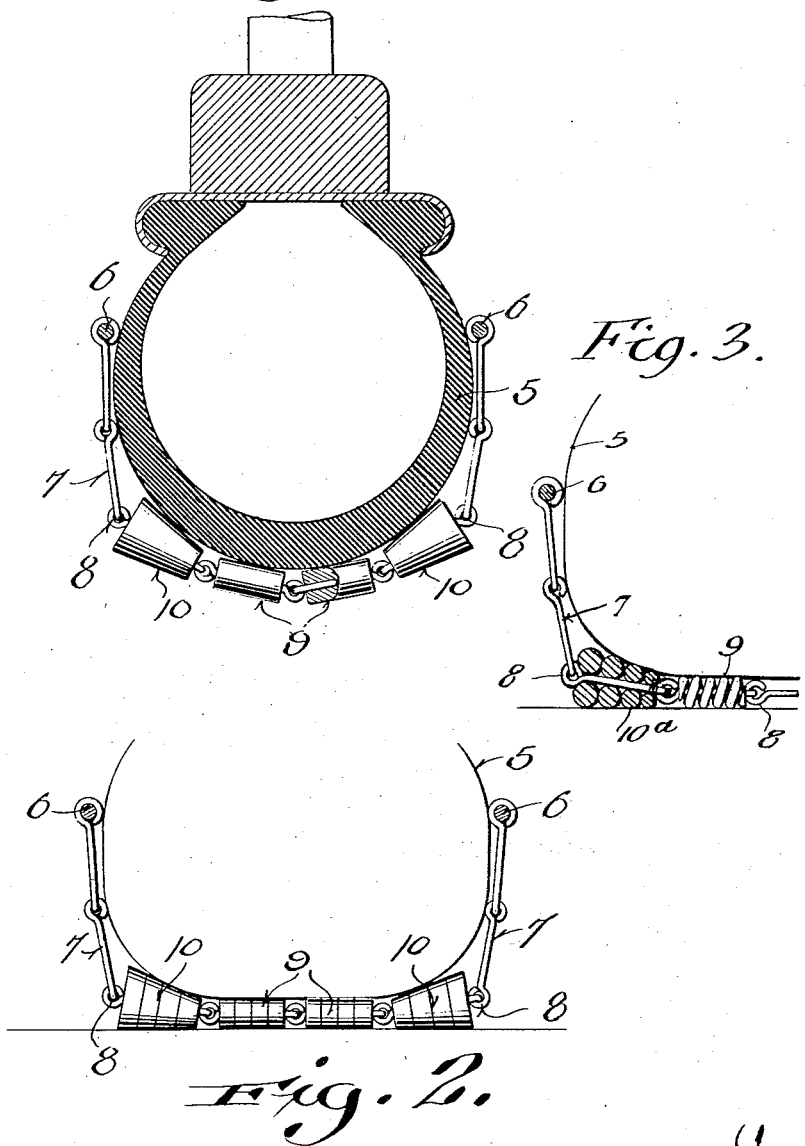

FRANK M. FICHTEN, OF MILWAUKEE, WISCONSIN, ASSIGNOR TO FRANKLIN RIGHTMIRE, OF PATERSON, NEW JERSEY.

ANTISKID ATTACHMENT FOR TIRES.

1,349,149.  Specification of Letters Patent.  Patented Aug. 10, 1920.

Application filed August 2, 1917. Serial No. 184,067.

*To all whom it may concern:*

Be it known that I, FRANK M. FICHTEN, a citizen of the United States, and resident of Milwaukee, in the county of Milwaukee and State of Wisconsin, have invented certain new and useful Improvements in Antiskid Attachments for Tires; and I do hereby declare that the following is a full, clear, and exact description thereof.

The present invention relates to new and useful improvements in non-skid devices for pneumatic tires, more particularly of that type including a series of chain sections extending transversely of the tire.

A common inconvenience of this type of non-skid devices is their tendency to bite into and thus injure the tire, and it is therefore primarily the object of the present invention to provide a non-skid device attachment of this general type, which is so formed that it does not bite into the body of the tire, and it is further an object to provide such a device which presents a maximum gripping action, particularly in resisting the lateral slipping tendency of the tire.

A further object resides in the provision of an anti-skid device of the above nature which is of exceedingly simple construction, permitting its manufacture at a low cost, and which may be as readily applied to or removed from a tire as those types of anti-skid devices now in use.

With the above and other advantages and objects in view, the invention resides more particularly in the novel combination, formation and arrangement of parts hereinafter specifically described and pointed out in the appended claims.

In the drawings:

Figure 1 is a transverse sectional view through a pneumatic tire, showing the improved anti-skid device associated therewith.

Fig. 2 is a similar view, of a modified form, but showing the tire compressed by the load strain of the vehicle.

Fig. 3 is still another modification showing the device having its anti-skid members formed of coiled springs.

Referring now more particularly to the accompanying drawings, 5 designates a conventional pneumatic tire and the body portion of the improved anti-skid device associated therewith is of a type heretofore generally used and comprising transverse chain sections disposed about the tire and held thereto by annular connecting bands 6 at the sides of the tire.

In the present instance these transverse chain sections comprise a series of rod links 7 loosely connected by the mutually engaged eyes 8 formed at their ends.

Disposed on the two centermost links are cylindrical rollers 9, the diameters of which are greater than the major diameters of the eyes 8, and disposed on the pair of links adjacent the said roller carrying links are frusto-conical rollers 10 having their smaller ends adjacent the rollers 9 and of a diameter substantially equal thereto.

By the foregoing arrangement the connecting eyes 8 of the links are held spaced from the surface of the tire, whereby they cannot bite into and thus injure the tire and the tire rests on the relatively large peripheries of the rollers 9 and 10. By the provision of the frusto-conical outer rollers 10, it will be seen, more particularly by reference to Fig. 2, that when the load strain of the vehicle is imparted to the tire, a concaved rest is afforded thereto, and it will be appreciated that if desired all of the rollers could be made conical and successively reduced in size toward the center and any desired number of rollers could be employed.

In addition to presenting a relatively large surface to the tire, to prevent injury thereto, the rollers 9 and 10 also present relatively larger end edge portions to the ground, providing a great resistance to transverse skidding tendency of the tire, in contradistinction to conventional types of anti-skid devices which present relatively small end edge portions. It is further noted that the rollers 9 and 10 are rotatable on their links 7, whereby wear is distributed over the entire periphery of said rollers. This rotatable mounting of the rollers, however, does not materially interfere with the gripping action thereof, and it is noted that in offering resistance to longitudinal sliding movement the chain sections will bow transversely of the tire, to thus present the end edge portions of said rollers in the direction of slipping movement.

While I have described the rollers 9 and 10 as loosely mounted on rod links 7, it is obvious that these members could comprise integral or otherwise rigid body portions of the links, it being appreciated that the essential feature of the invention resides in the provision of an anti-skid device comprising link sections having their intermediate portions of greater diameter than their end connecting portions, whereby to shield said end connecting portions from the tire. It is to be understood that various embodiments of my invention may be employed, and that the invention is limited only by the scope of the appended claims.

In the embodiment of my invention disclosed by Fig. 2 the rollers 9 and 10 are composed of a series of rollers or washers and by so constructing said rollers a cheaper structure is provided, in that the washers may be punched from a sheet of metal, whereas in the form depicted by Fig. 1, it is necessary to drill the rollers.

As shown in Fig. 3, a modified form of rollers may be provided, wherein the rollers constitute helixes of stout wire, the wire forming the frusto-conical outer rollers, designated here at 10ª, being tapered whereby the internal diameter of the roller is maintained constant to properly mount the roller on the link 7.

What is claimed is:

1. An anti-skid attachment for tires comprising a series of chain sections each including a series of links successively increasing in diameter from the center of the chain section.

2. An anti-skid attachment for tires comprising a series of chain sections each formed of mutually connected links, and rollers disposed on said links and of greater diameter than the connecting portions of the links.

3. An anti-skid attachment for tires comprising a series of chain sections each formed of mutually connected links, cylindrical rollers mounted on the centermost links and of greater diameter than the connecting portions of the links and frusto-conical rollers mounted on the links outwardly of and adjacent said center links, with their smaller ends adjacent and of a diameter substantially equal to the first named rollers.

4. An anti-skid attachment for tires comprising a series of chain sections each formed of mutually connecting links, cylindrical rollers mounted on the centermost links and of greater diameter than the connecting portions of the links, and frusto-conical rollers mounted on the links outwardly of and adjacent said center links, with their smaller ends adjacent and of a diameter substantially equal to the first named rollers, said rollers being composed of a series of washers substantially as described.

5. A traction attachment for a vehicle driving wheel including a flexibly connected series of members having means to secure it to the wheel with said members in contact with the tread face of the wheel, said members increasing in thickness one after another.

6. A flexible traction attachment for a vehicle driving wheel including a transverse traction element graduated in thickness, and means to secure said element across the tread part of the wheel with its least thickness substantially coincident with the center line of the wheel tread.

7. A traction attachment for vehicle driving wheels including a traction chain graduated in thickness, and means to secure the chain across the tread part of the wheel with its least thickness substantially coincident with the center line of the tread.

8. A traction attachment for a vehicle driving wheel including a transverse traction element formed gradually thicker from an intermediate point toward both ends thereof, and means to secure said element across the tread part of the wheel with its portion of least thickness substantially coincident with the center line of the wheel tread.

9. A traction attachment for a vehicle driving wheel including a plurality of transverse traction elements each formed gradually thicker from an intermediate point toward both ends thereof, and means to connect said elements flexibly together, in combination with means to secure said attachment to the wheel with said elements extending across the wheel tread and with the least thickness of each of them substantially coincident with the center line of the tread.

In testimony that I claim the foregoing I have hereunto set my hand at Milwaukee, in the county of Milwaukee and State of Wisconsin, in the presence of two witnesses.

FRANK M. FICHTEN.

Witnesses:
 FRANK S. RATCLIFFE,
 VERN H. BOSWORTH.